3,326,951
PROPYLENE-(1,2)-BIS-DITHIOCARBAMATES
Hellmuth Lehmann, Wuppertal-Elberfeld, Ferdinand Grewe, Burscheid, and Walter Lautenschlager, Wuppertal-Vohwinkel, Germany, assignors to Farbenfabriken Bayer Aktiengesellschaft, Leverkusen, Germany, a German corporation
No Drawing. Filed Feb. 20, 1963, Ser. No. 260,037
Claims priority, application Germany, Mar. 1, 1962, F 36,152
4 Claims. (Cl. 260—439)

The fungicidal activity of alkyl-bis-dithiocarbamic acid salts of alkali metals, alkaline earth metals and heavy metals has been known for a long time. Thus for example in U.S. Patent No. 2,317,765 fungicidally active mixtures are claimed which contain, as active ingredient, the di-sodium, cupric or ferric salt of ethylene-bis-dithiocarbamic acid.

Furthermore in Austrian patent specification No. 193,-891, disodium, cupric and zinc propylene-bis-dithiocarbamates are described as substances active against plant-pathogenic fungi.

Finally the published documents of South African patent application No. 60/5,125 relate to fungicidal compounds based on zinc and calcium salts of ethylene-bis-dithiocarbamic acid whose ethylene bridge is mono- or disubstituted by monovalent aliphatic radicals, zinc propylene-, ethyl-ethylene- and dimethylethylene-bisdithiocarbamates being mentioned as especially effective.

It has now been found that the propylene-(1,2)-bis-dithiocarbamic acid salts not hitherto described in the literature, of barium, strontium, magnesium, nickel and cobalt, as well as of di- and tri-valent iron, possess outstanding fungicidal properties.

These compounds are especially suitable for combating fungus disease activators but distinctly excel over the known ethylene- or propylene-bis-dithiocarbamates in this respect. Thus for example—as may be seen in detail from the enclosed tables—ferrous as well as ferric propylene-bis-dithiocarbamate is distinguished, from the corresponding zinc and iron salts of ethylene-bis-dithiocarbamic acid as well as from zinc propylene-bis-dithiocarbamate, by a significantly superior activity, while barium and magnesium propylene-bis-dithiocarbamate are not only strongly active fungicides but also considerably better tolerated by plants than the known calcium propylene-bis-dithiocarbamate. Apart from these advantages the nickel salt of propylene-bis-dithiocarbamic acid possesses a further special and technically valuable effect.

The said compound not only distinctly excel over the zinc ethylene-bis-dithiocarbamate known as a standard fungicidal preparation when used against *Phytophthora infestans* on tomatoes under greenhouse conditions, but is furthermore strongly activated when outside, the activation increasing with increasing intensity of illumination and exposure time on the plant, so that in open conditions, nickel propylene-bis-dithiocarbamate possesses a better fungicidal activity than the corresponding zinc salts of ethylene- and propylene-bis-dithiocarbamic acid. This positive influence of weather conditions was in no way to be foreseen. It arises presumably from a destabilising effect, which can be confirmed by experiments in vitro.

The production of the propylene-bis-dithiocarbamic acid salts to be used according to the invention is carried out by methods known in principle by reaction of propylene diamine (1,2-diaminopropane) with carbon disulphide in the presence of a strong base, preferably the aqueous solution of an alkali metal or ammonium hydroxide followed by precipitation of the soluble propylene-bis-dithiocarbamate formed with an aqueous solution of the alkaline earth or heavy metal salt concerned.

The reaction product thereby separates out, mostly in the form of scarcely soluble precipitate, from the mixture and can be readily isolated by simple filtration.

The process is illustrated in more detail by way of a representative example of the production of nickel and ferrous propylene-bis-dithiocarbamates:

255 g. of propylene diamine are dissolved in 1.87 litres of water, 550 g. of carbon disulphide are added dropwise to this solution and the reaction mixture is then treated with 555 g. of 46% sodium hydroxide solution. The solution of propylene-bis-dithiocarbamic acid sodium salt obtained is precipitated, (a) with a nickel sulphate solution, whereby 960 g. of nickel propylene-bis-dithiocarbamate are obtained, or
(b) with a ferrous sulphate solution, whereby ferrous propylene-bis-dithiocarbamate is obtained in a yield of 1060 g.

On account of their outstanding fungicidal properties, the agents of the present invention are suitable for combating all those phytopathogenic fungi against which hitherto the abovementioned known ethylene- or propylene-bis-dithiocarbamates have been applied, i.e. primarily against *Phytophthora infestans, Cladosporium fulvum*, or *Alternaria solani* on tomatoes and potatoes, against *Peronospora (Plasmopara viticola)* on vines, *Venturia inaequalis* on stone fruit as well as against other fungoid pests on various cultivated plants. Ferrous propylene-bis-dithiocarbamate has moreover proved especially effective against grain rust, while the corresponding nickel salt comes in consideration especially for combating leaf spot disease on tea.

The application of the compounds according to the invention as fungicides proceeds in ways known in principle, i.e. preferably in combination with suitable solid or liquid extenders or diluents. As solid carriers, chalk, silica gel, kieselguhr, talc, bentonite, and the like are chiefly to be considered, while for the production of liquid formulations water is especially applied as diluent. Since the propylene-bis-dithiocarbamates to be employed according to the present invention are however to a great extent water-insoluble, it is expedient in making aqueous dilutions, and indeed sometimes necessary, first to dissolve the agent in question in a solvent aid such as acetone or dimethyl formamide and to dilute this preliminary mixture with water in the presence of a commercial non-ionic emulsifier as well as optionally with the use of wetting, adhesive or solid formulation aids, to the concentration of active agent desired in any given case.

The employment of the agents according to the invention in combination with other fungicides and/or insecticides is possible.

The following examples are given to illustrate the invention.

(a) Determination of the fungicidal activity against *Phytophthora infestans* on tomatoes.

Young tomato plants of the "Bonny Best" are sprayed at the 4- to 5-leaf stage with aqueous emulsions or suspensions of the preparations mentioned below. The plants are then allowed to drain off for 24 hours, sprinkled with a spore suspension of *Phytophthora infestans* and then brought into a moist chamber in which a relative humidity of about 100% prevails. After the incubation period has passed, the fungus infestation rate is determined by evaluating the individual feather-leaves, values of 0 (no infestation) to 5 (leaf infested on the whole surface by fungus, or destroyed) being set up and the degree of infestation expressed as a percentage of the infestation of the untreated control plants (=100)

(b) Test of the fungicidal activity when employed against *Plasmopara viticola* on vines.

Young pot vines of the type Muller-Thurgau are inoculated 24 hours after the application of each of the preparations mentioned below in analogous manner to that used in the experiments with *Phytophthora infestans*, with spores of *Plasmopara viticola*. The evaluation of the tests proceeds as described under (a).

The results obtained in the individual series of experiments with the different test fungi are listed in the following Tables 1 to 7.

Fungicidal activity of the ferrous, ferric, barium and magnesium salts of the propylene-bis-dithiocarbamic acid in comparison with zinc and calcium propylene-bis-dithiocarbamates as well as with zinc and ferrous ethylene-bis-dithiocarbamates:

TABLE 1
[Test fungus: *Phytophthora infestans* on tomatoes]

| Preparation | Active agent concentration in percent | Infestion in percent of the untreated controls (=100) |
|---|---|---|
| Ferrous-propylene bisdithiocarbamate | 0.0125 / 0.0031 | 0 / 14 |
| Zinc-propylene bisdithiocarbamate | 0.0125 / 0.0031 | 2 / 18 |
| Zinc-ethylene bisdithiocarbamate | 0.0125 / 0.0031 | 36 / 59 |

TABLE 2
[Test fungus: *Plasmopara Viticola* on vines]

| Preparation | Active agent concentration in percent | Infestion in percent of the untreated controls (=100) |
|---|---|---|
| Ferrous-propylene bisdithiocarbamate | 0.0008 | 19 |
| Ferrous-ethylene bisdithiocarbamate | 0.0008 | 39 |

TABLE 3
[Test fungus: *Phytophthora infestans* on tomatoes]

| Preparation | Active agent concentration in percent | Infestation rate in percent of the untreated controls (=100) |
|---|---|---|
| Ferric-propylene bisdithiocarbamate | 0.0062 / 0.025 | 0 / 0 |
| Zinc-propylene bisdithiocarbamate | 0.0062 / 0.025 | 4 / 13 |
| Zinc-ethylene bisdithiocarbamate | 0.0062 | 26 |

TABLE 4
[Test fungus: *Phytophthora infestans* on tomatoes (greenhouse experiments)]

| Preparation | Active agent concentration in percent | Infestation rate in percent of the untreated controls (=100) |
|---|---|---|
| Nickel-propylene bisdithiocarbamate | 0.025 / 0.0032 / 0.0008 | 7 / 21 / 40 |
| Zinc-ethylene bisdithiocarbamate | 0.025 / 0.0032 / 0.0008 | 6 / 48 / 76 |

TABLE 5
[Test fungus: *Phytophthora infestans* on tomatoes (expt. in the open)]

| Preparation | Active agent concentration [1] in percent | Infestation rate in percent on 1.8.61 | 8.8.61 | 23.8.61 |
|---|---|---|---|---|
| Nickel-propylene bisdithiocarbamate | 0.15 | 4 | 4 | 32 |
| Zinc-propylene bisdithiocarbamate | 0.15 | 9 | 10 | 35 |
| Zinc-ethylene bisdithiocarbamate | 0.15 | 10 | 15 | 73 |
| Controls (untreated) | | 32 | 71 | 97 |

[1] Amount employed 1,000 l. broth per hectare.

TABLE 6
[Test fungus: *Phytophthora infestans* on tomatoes]

| Preparation | Active agent concentration in percent | Infestation in percent of the untreated controls (=100) |
|---|---|---|
| Barium-propylene bisdithiocarbamate | 0.025 | 0 |
| Magnesium-propylene bisdithiocarbamate | 0.025 | 0 |
| Calcium-propylene bisdithiocarbamate | 0.025 | 0.6 |
| Zinc-ethylene bisdithiocarbamate | 0.025 / 0.0062 | 13 / 26 |

Table 7 shows plant tolerance* of the barium and magnesium propylene-bis-dithiocarbamates in comparison with propylene-bis-dithiocarbamic acid calcium salt.

TABLE 7
[Test plant: Dwarf beans (Saxa)]

| Preparation | Active agent concentration 0.3% | 0.15% |
|---|---|---|
| Barium-propylene bisdithiocarbamate | I | O |
| Magnesium-propylene bisdithiocarbamate | II | I |
| Calcium-propylene bisdithiocarbamate | III | II |

From the above tables it is clear that ferrous or ferric or nickel propylene-bis-dithiocarbamates when employed against *Phytophthora infestans* on tomatoes clearly excel with respect to fungicidal activity the known zinc salts of ethylene- and propylene-bis-dithiocarbamic acid. Moreover the given experimental results clearly show the unquestionable superiority of the ferrous propylene-bis-dithiocarbamate in comparison to the corresponding ethylene bis-dithiocarbamic acid salt against *Plasmopara viticola* on vines. Finally the superior fungicidal activity of propylene-bis dithiocarbamic acid barium and magnesium salts compared with the corresponding known calcium salt is clearly apparent, as well as the better plant toleration of the two first mentioned compounds.

We claim:
1. The bis-dithiocarbamic acid metal salt of a compound having the formula

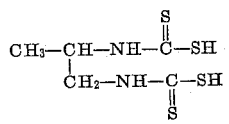

the metal thereing being a member selected from the group consisting of strontium, nickel, and cobalt.
2. Cobalt propylene-(1,2)-bis-dithiocarbamate.

* The evaluation took place 4 days after spraying. Degrees of merit from O to V were attributed (O=without damage; V=plant dead).

3. Strontium propylene-(1,2)-bis-dithiocarbamate.
4. Nickel propylene-(1,2)-bis-dithiocarbamate.

References Cited

UNITED STATES PATENTS

| | | | |
|---|---|---|---|
| 2,317,765 | 4/1943 | Hester | 167—22 |
| 2,974,082 | 3/1961 | Collins | 167—22 |
| 2,983,747 | 5/1961 | Campbell et al. | 260—455 |
| 3,012,053 | 12/1961 | Lesslie | 260—455 |
| 3,039,918 | 6/1962 | Hambsch et al. | 167—22 |
| 3,082,229 | 3/1963 | Nash | 260—455 X |
| 3,085,043 | 4/1963 | Beaver et al. | 167—22 |

FOREIGN PATENTS 193,891  12/1957  Austria.

CHARLES B. PARKER, *Primray Examiner.*

JULIAN S. LEVITT, JOSEPH P. BRUST, *Examiners.*

GEORGE A. MENTIS, DALE R. MAHANAND,
*Assistant Examiners.*